US012471903B2

(12) United States Patent
Willard (10) Patent No.: US 12,471,903 B2
(45) Date of Patent: Nov. 18, 2025

(54) MECHANICAL DEPLOYMENT DEVICE FOR HIP ALL-SUTURE ANCHOR

(71) Applicant: Conmed Corporation, Largo, FL (US)

(72) Inventor: Benjamin Willard, Clearwater, FL (US)

(73) Assignee: Conmed Corporation, Largo, FL (US)

( * ) Notice: Subject to any disclaimer, the term of this patent is extended or adjusted under 35 U.S.C. 154(b) by 288 days.

(21) Appl. No.: 17/927,083

(22) PCT Filed: Jun. 4, 2021

(86) PCT No.: PCT/US2021/035858
§ 371 (c)(1),
(2) Date: Nov. 22, 2022

(87) PCT Pub. No.: WO2021/247973
PCT Pub. Date: Dec. 9, 2021

(65) Prior Publication Data
US 2023/0210513 A1    Jul. 6, 2023

Related U.S. Application Data

(60) Provisional application No. 63/034,421, filed on Jun. 4, 2020.

(51) Int. Cl.
*A61B 17/04* (2006.01)
*A61B 90/00* (2016.01)
*A61B 17/00* (2006.01)

(52) U.S. Cl.
CPC .......... *A61B 17/0401* (2013.01); *A61B 90/03* (2016.02); *A61B 2017/00407* (2013.01); *A61B 2017/0409* (2013.01); *A61B 2090/037* (2016.02)

(58) Field of Classification Search
CPC .............. A61B 2017/00407; A61B 2017/0409
See application file for complete search history.

(56) References Cited

U.S. PATENT DOCUMENTS 6,780,198 B1 *  8/2004  Gregoire ............ A61B 17/0401
                                                    606/232
10,292,694 B2 *  5/2019  Graul ................. A61B 17/0401
(Continued)

FOREIGN PATENT DOCUMENTS

| JP | 2005-011189 A2 | 4/2005 |
| JP | 2009-106757 A2 | 5/2009 |
| WO | WO2019182645 A1 | 9/2019 |

OTHER PUBLICATIONS

International Search Report Form PCT/ISA/220, International Application No. PCT/US2021/035858, pp. 1-11, Dated Sep. 17, 2021.
(Continued)

*Primary Examiner* — Alexander J Orkin
(74) *Attorney, Agent, or Firm* — Bond, Schoeneck & King, PLLC; Frederick J.M. Price (57) ABSTRACT

A deployment device for an all suture anchor having a braided anchor and a suture filament extending through the braided anchor. A fork extends longitudinally through the body of the device and is moveable between an extended position and a withdrawn position to position and then release the braided anchor. A ratchet wheel drives a spool coupled to the ratchet wheel by a frangible link to wind up the suture filament to deploy the braided anchor. When sufficient tension is achieved to fully deploy the braided anchor, the frangible link will break, thereby releasing the suture filament to leave the deployed braided anchor in place with the suture filament extending from the pilot hole. All operations are accomplished by one lever that selectively (Continued)

withdraws the fork, rotates the ratchet wheel, and then allows release of the filament with the use of just a single hand.

9 Claims, 11 Drawing Sheets

(56) References Cited

U.S. PATENT DOCUMENTS

| | | | |
|---|---|---|---|
| 2008/0051836 A1* | 2/2008 | Foerster | A61B 17/0401 |
| | | | 606/232 |
| 2009/0069823 A1 | 3/2009 | Foerster et al. | |
| 2010/0087857 A1* | 4/2010 | Stone | A61B 17/0469 |
| | | | 606/232 |
| 2019/0282226 A1* | 9/2019 | Epstein | A61B 17/0469 |
| 2020/0107840 A1 | 4/2020 | Summitt et al. | |
| 2020/0178951 A1* | 6/2020 | Johnson | D04C 1/06 |
| 2023/0200799 A1* | 6/2023 | Rogers | A61B 17/0401 |
| | | | 606/232 |

OTHER PUBLICATIONS

JP Office Action, Application No. 2022-573544, dated Aug. 16, 2023, pp. 1-4.

* cited by examiner

MECHANICAL DEPLOYMENT DEVICE FOR HIP ALL-SUTURE ANCHOR

CROSS-REFERENCE TO RELATED APPLICATIONS

This application is a national stage application under 35 U.S.C. 371 based on international patent application PCT/US21/35858 filed on Jun. 4, 2021, which claims priority to U.S. Provisional Patent Application Ser. No. 63/034,421, filed on Jun. 4, 2020, the entireties of which are incorporated herein by reference.

BACKGROUND OF THE INVENTION

1. Field of the Invention

The present invention relates to surgical anchors and, more specifically, to a deployment device for all-suture anchors.

2. Description of the Related Art

Suture anchors are commonly employed during surgical procedures to secure soft tissue to bone. All suture anchors may be partially inserted into a pre-formed pilot hole in the bone so that an expandable portion of the anchor is position inside the bone with filamentary sutures extending out of the hole for attachment to the tissue being used for a repair. All-suture anchors can pull out in hard bone, however, as they are not able to deploy and hold in the same manner as in softer bone.

To address this problem, deployment devices have been used to assist with the installation of all suture anchors. However, current deployment devices require the use of two hands for both tensioning and/or uncleating of the anchor and are thus cumbersome to use. Even if the deployment devices can be deployed with one hand, they nevertheless require two hands for manual uncleating of the suture from the deployment device after the anchor has been deployed. Accordingly, there is a need in the art for an approach that can be more easily deploy and release an all suture anchor.

BRIEF SUMMARY OF THE INVENTION

The present invention is a deployment device for an all suture anchor having a braided anchor and a suture extending through the braided anchor that can properly tension the anchor for deployment and release the tails of the suture. The device comprises a body and a fork extending longitudinally through the body that is moveable between an extended position and a withdrawn position to position and release the braided anchor in the pilot hole of the bone where the anchor is to be deployed. A ratchet wheel is rotatably mounted to the body to selectively drive a spool that is coupled to the ratchet wheel by a frangible link to wind up and then release the suture of the anchor. A lever mounted to the body can move the fork longitudinally within the body from the extended to the withdrawn position and can rotate the ratchet wheel to wind up the suture to deploy the braided anchor. The lever is coupled to the fork via a link that that is pivotally coupled to the link at a first end and coupled at an opposing end to the fork by a bearing member. The bearing member includes a notch that is engaged by the link when the lever is first moved an open position from the initial position. The body includes a pawl positioned to selectively engage the ratchet wheel. A first fence prevents the pawl from engaging the ratchet wheel when the lever is an initial position and a second fence prevents the pawl from engaging the ratchet wheel when the lever is an open position. The pawl is free to engage the ratchet wheel when the lever is first moved into a closed position. A latch can releasably secure the latch in the initial position for easy installation in a drill guide. A detent associated with the body can lock the fork in the withdrawn position. The fork withdraws approximately 14 mm to position the tip of the fork approximately 6 mm below the surface of a pilot hole. The frangible link is configured to break in response to a force of about 40 pounds of tension on the filament captured by the spool.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
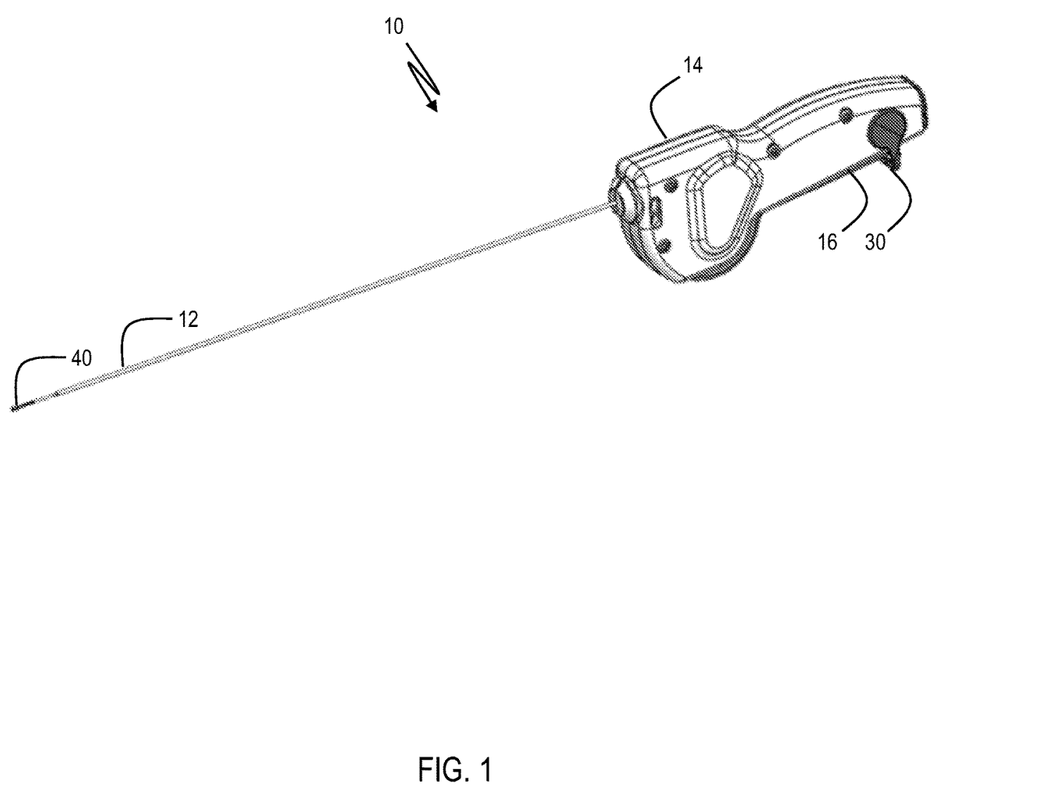
FIG. 1 is a perspective view of an all suture anchor deployment device according to the present invention.

Referring the drawings, wherein like numerals refer to like parts throughout, there is seen in FIG. 1 an all suture anchor deployment device 10 having a fork 12 that extends longitudinally through and out of a main body 14 and out of the distal end of body 14 for grasping an all-suture anchor formed from a braided anchor and a suture filament. As in conventional approaches, the braided anchor is captured by fork 12 and deployment device 10 is driven into a pilot hole formed in a bone, usually through a drill guide that is left in place, and then the anchor is deployed by pulling on the suture filament so that the braided anchor expands in place with the suture tails extending out of the pilot hole for use in securing tissue to the bone.

Figure 4:
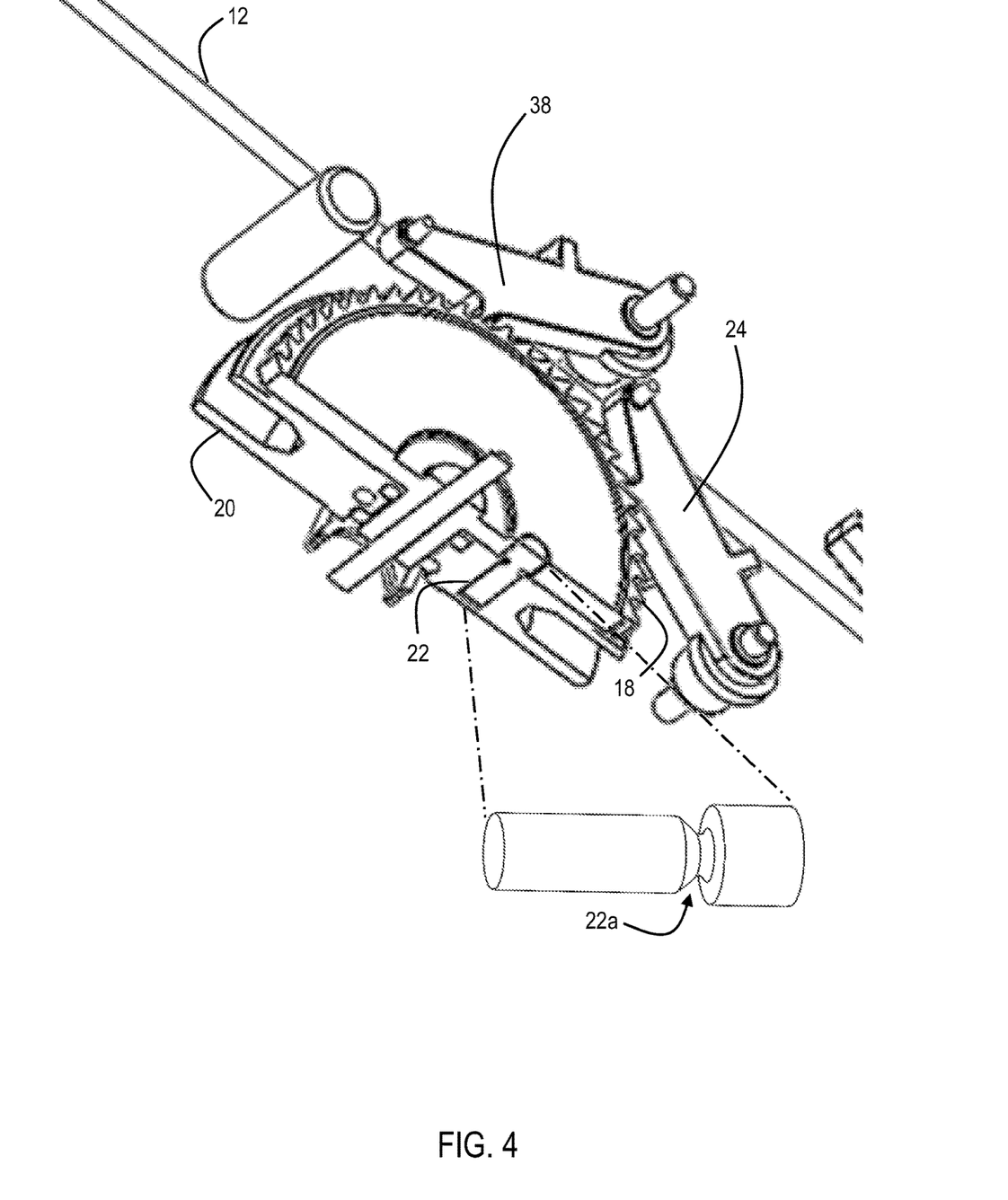
FIG. 4 is a partial cutway view of a ratchet wheel and spool coupled by a frangible link for an all suture anchor deployment device according to the present invention.

Device 10 includes a lever 16 that can selectively and partially withdraw fork 12 after insertion of the anchor into the pilot hole. Device 10 also includes a ratchet wheel 18 in body 14 that is rotated by movement of lever 16. Ratchet wheel 18 is coupled to a spool 20 via a frangible link 22 so that ratcheting of ratchet wheel 18 by lever 16 and advancing pawl 24 will rotate spool 20 until sufficient tension on spool 20 causes link 22 to break and thus sever the connection to ratchet wheel 18. Spool 20 is coupled to the suture filament of the all-suture anchor so that spool 20 can reel in the suture filament that is woven through the braided anchor to provide the force that is necessary to fully deploy the braided anchor in place. When the tension on the suture filament exceeds the predetermined force required to break frangible link 22, spool 20 will decouple from ratchet wheel 18 so that the suture is free to unwind from spool 20 to leave the deployed anchor in place with the released suture filament extending from the pilot hole simply by withdrawing device 10 from the surgical location. The predetermined force required to break frangible link 22 is thus selected to ensure proper deployment of the braided anchor and then the release of the suture filament without any manual operation other than opening and closing of lever 16, which can easily be accomplished one-handed. In one embodiment, frangible link 22 may be configured to break in response to a force of approximately 40 pounds of tension on filament to ensure proper deployment of the anchor. As seen in FIG. 4, frangible link 22 may comprise a cylindrical pin having a circumferential notch 18a formed therein so that link 22 will break into two pieces in response to the predetermined amount of force. A one-way pawl 38 remains in engagement with ratchet wheel 18 to prevent unspooling of filament from spool 20 while spool 20 is coupled to ratchet wheel 18.

Figure 5:
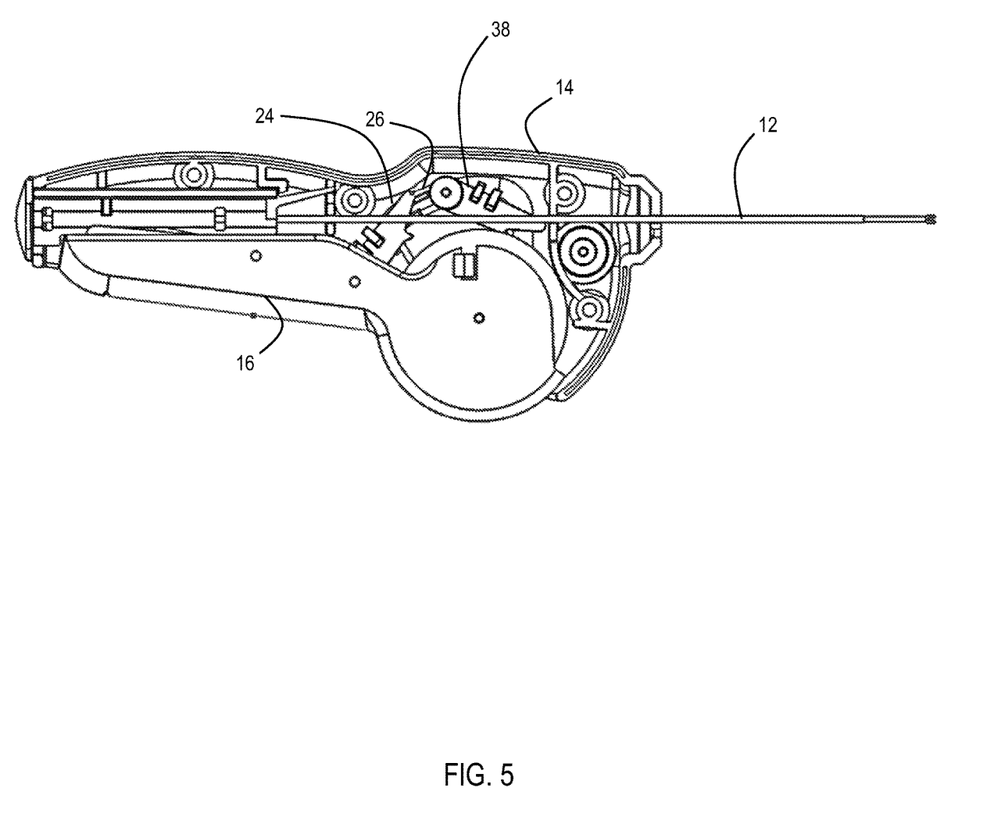
FIG. 5 is a side view of an all suture anchor deployment device according to the present invention in a first, closed position.
Figure 6:
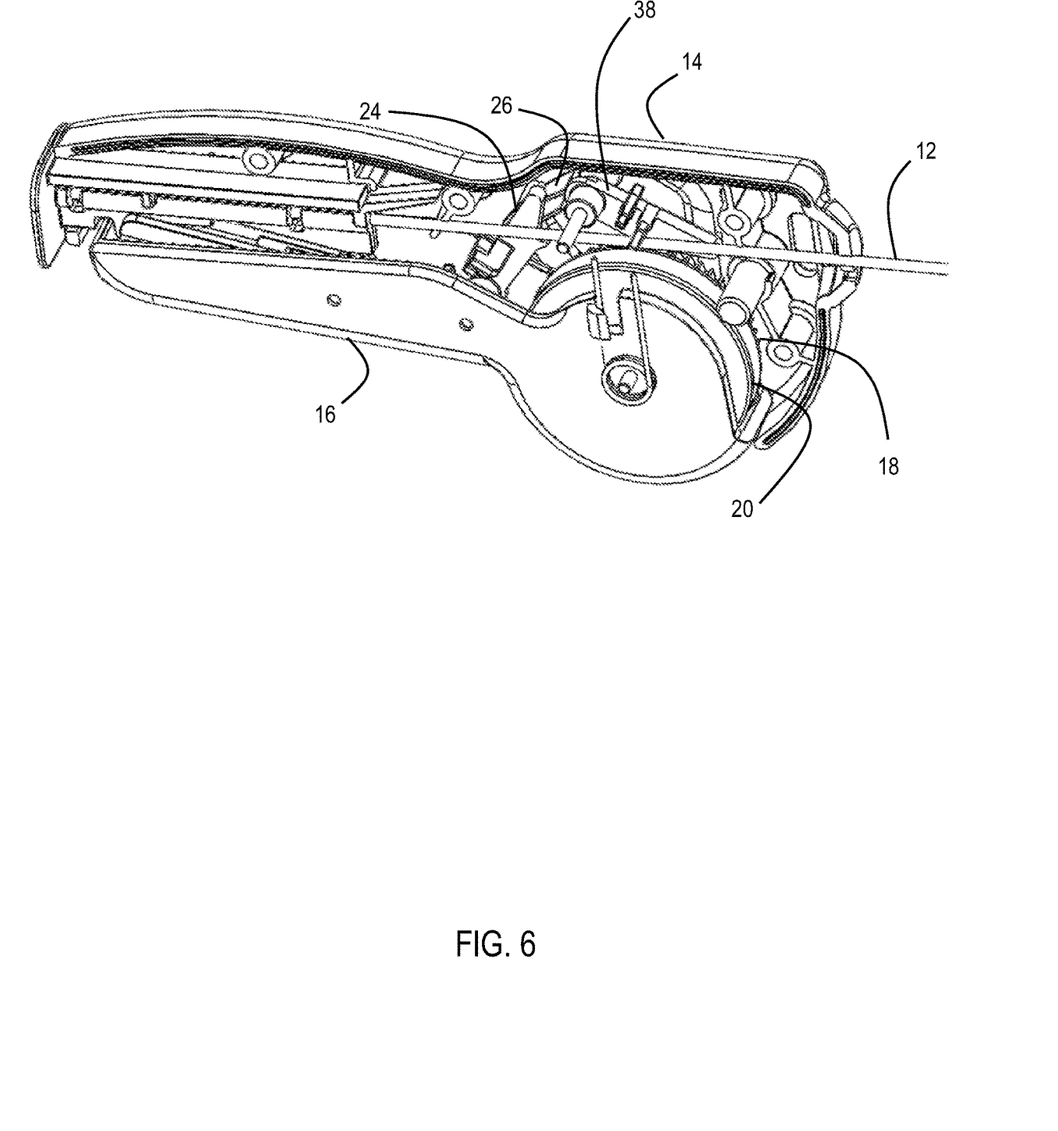
FIG. 6 is a top perspective view of an all suture anchor deployment device according to the present invention in a partially disassembled configuration in a first, closed position.

As seen in FIGS. 5 and 6, in an initial, first position used for insertion of anchor, fork 12 of device 10 is fully extended from body 14. Lever 16 is closed against body 14 and an advancing pawl 24 associated with ratchet wheel 18 is disengaged from ratchet wheel 18 by a first fence 26 so that movement of lever 16 will not cause ratcheting of ratchet wheel 18 and thus rotation of spool 20. Lever 16 is preferably locked in the position of FIG. 5 by a latch 30 that is pivotally mounted to body and can retain lever 16 in the closed position of FIG. 1 when device 10 malleted through a drill guide to insert the anchor into the pilot hole as lever 16 is preferably biased for movement into an open position, such as by a spring or other bias element.

Figure 2:
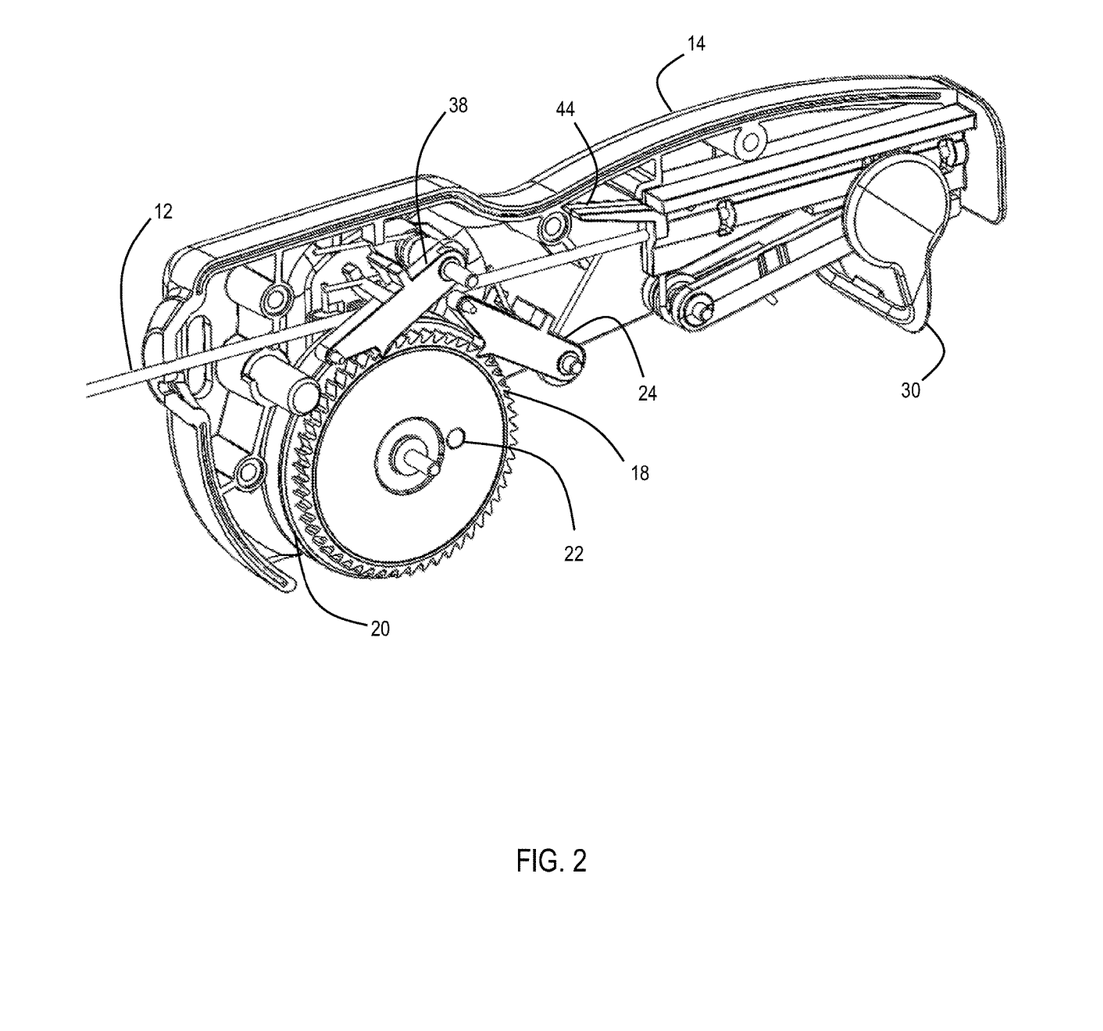
FIG. 2 is a perspective view an all suture anchor deployment device according to the present invention in a partially disassembled configuration.
Figure 3:
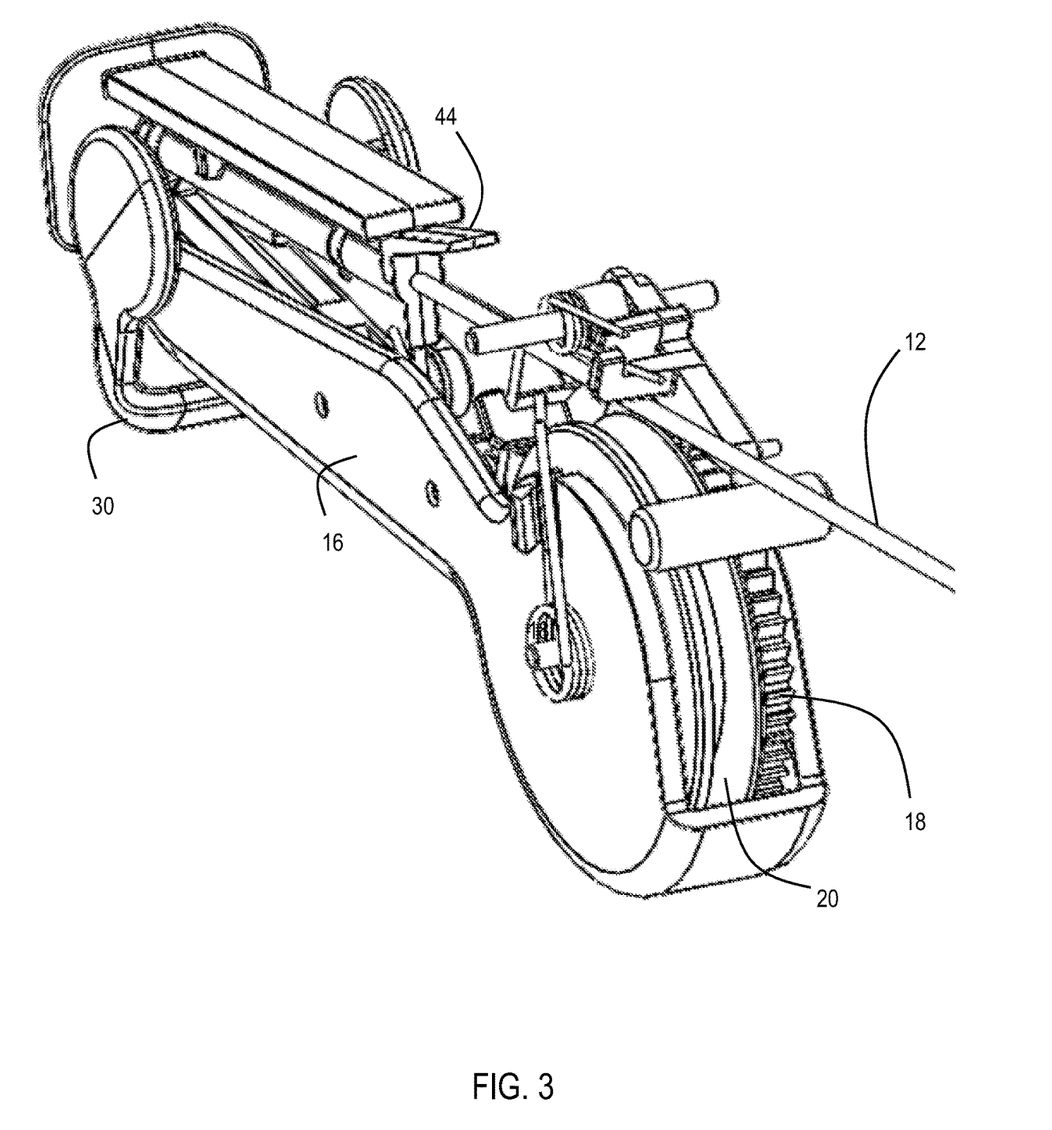
FIG. 3 is another perspective view an all suture anchor deployment device according to the present invention in a partially disassembled configuration.
Figure 7:
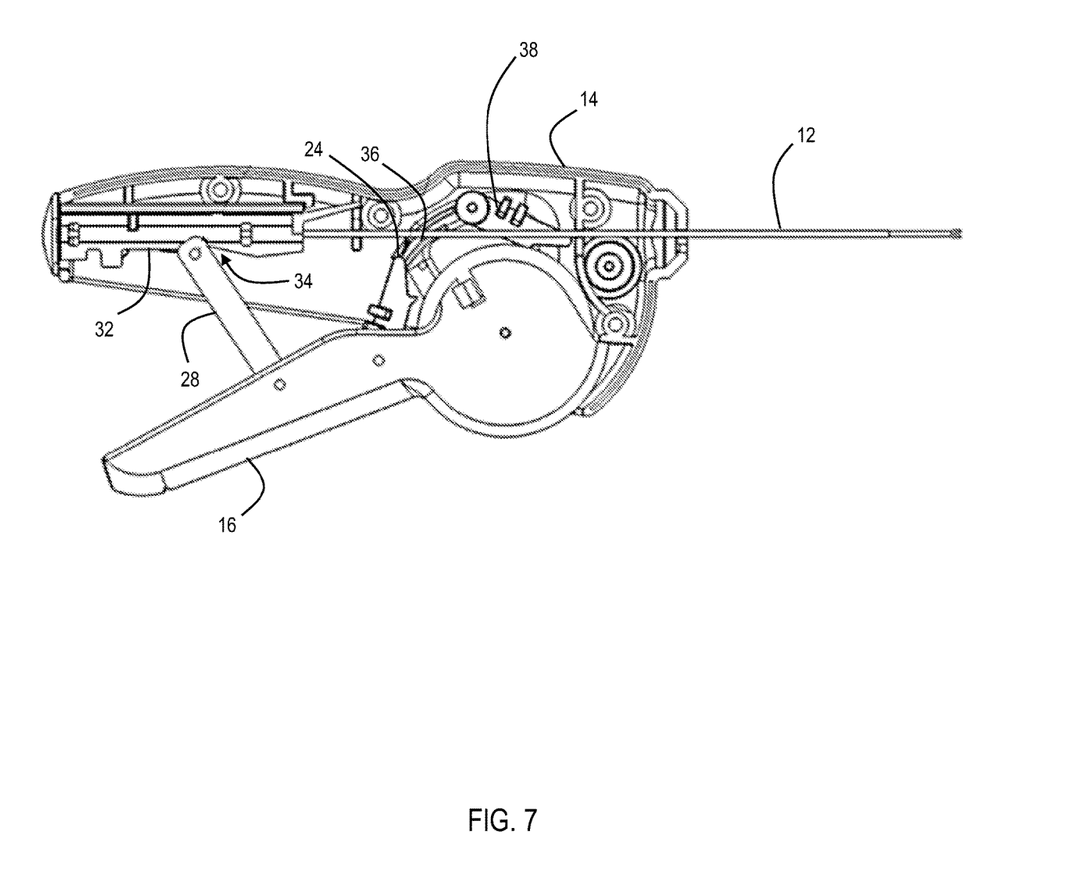
FIG. 7 is a side view of an all suture anchor deployment device according to the present invention in a second, open position.
Figure 8:
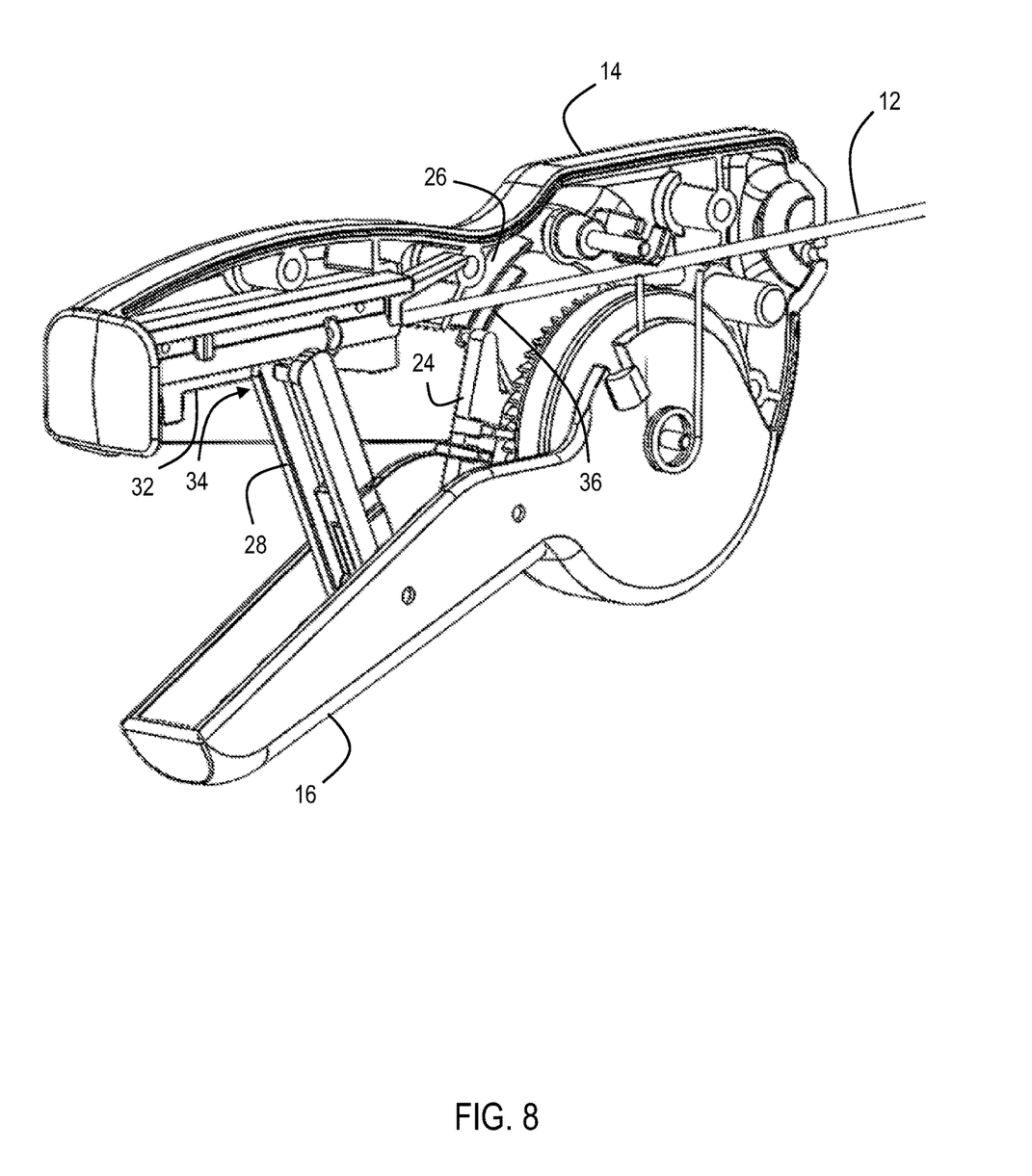
FIG. 8 is a rear perspective view of an all suture anchor deployment device according to the present invention in a partially disassembled configuration in a second, open position.

Referring to FIGS. 7 and 8, after positioning of braided anchor in the pilot hole, latch 30 is released so that lever 16 can move into an open, second position when lever 16 is unlocked from body 14. A link 28 is pivotally coupled to lever 16 to allow lever 16 to withdraw fork 12 when lever 16 is returned to the closed position. For example, link 28 may be coupled to fork 12 via a longitudinally extending bearing member 32 secured to fork 12. Bearing member 32 includes a notch 34 that allows link 28 to be disengaged from fork 12 when initially provided in the closed position of FIG. 1, but engaged with fork 12 once lever 16 is opened into the position of FIG. 2 and link 28 moves into notch 34. For example, when lever 16 is opened into the second position of FIG. 2 for the first time, link 28 moves along bearing member 32 until link 28 is captured in a notch 34, thereby coupling lever 16 to fork 12. Advancing pawl 24 associated with ratchet wheel 18 continues to be separated from ratchet wheel 18 by a second fence 36 so that ratchet wheel 18 is not driven by the movement of lever 16.

Figure 9:
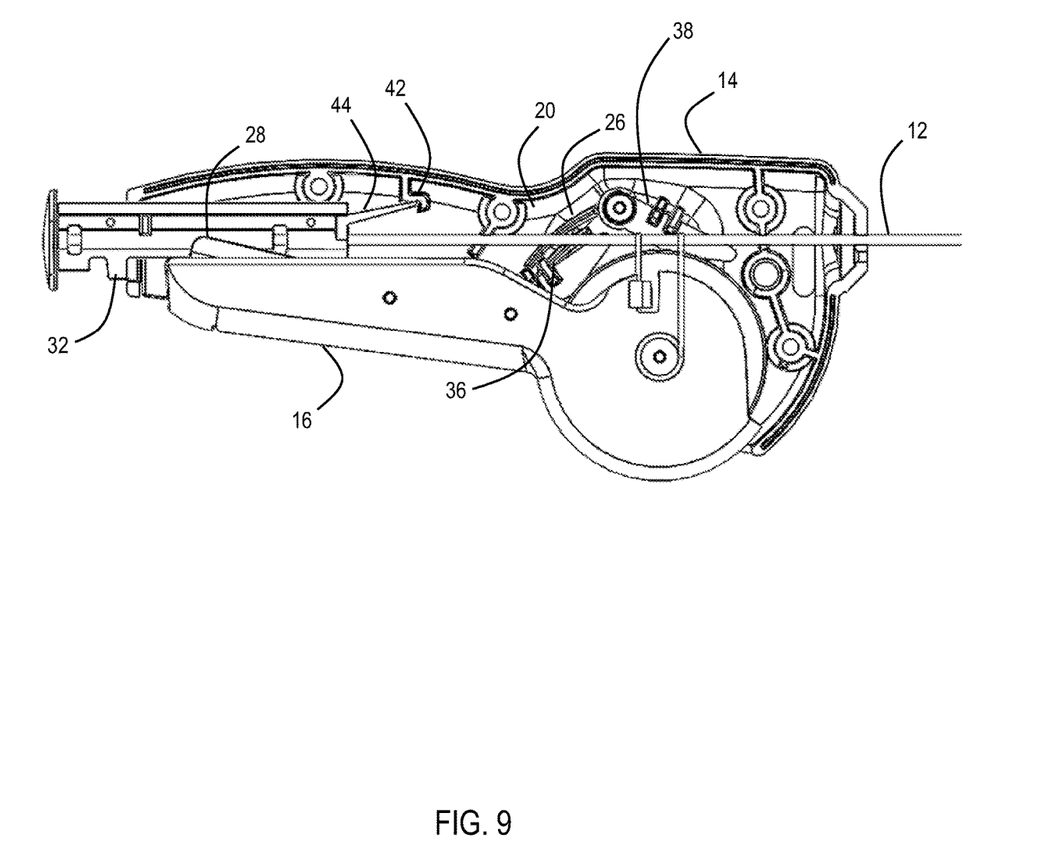
FIG. 9 is a side view of an all suture anchor deployment device according to the present invention in a third, closed position.
Figure 10:
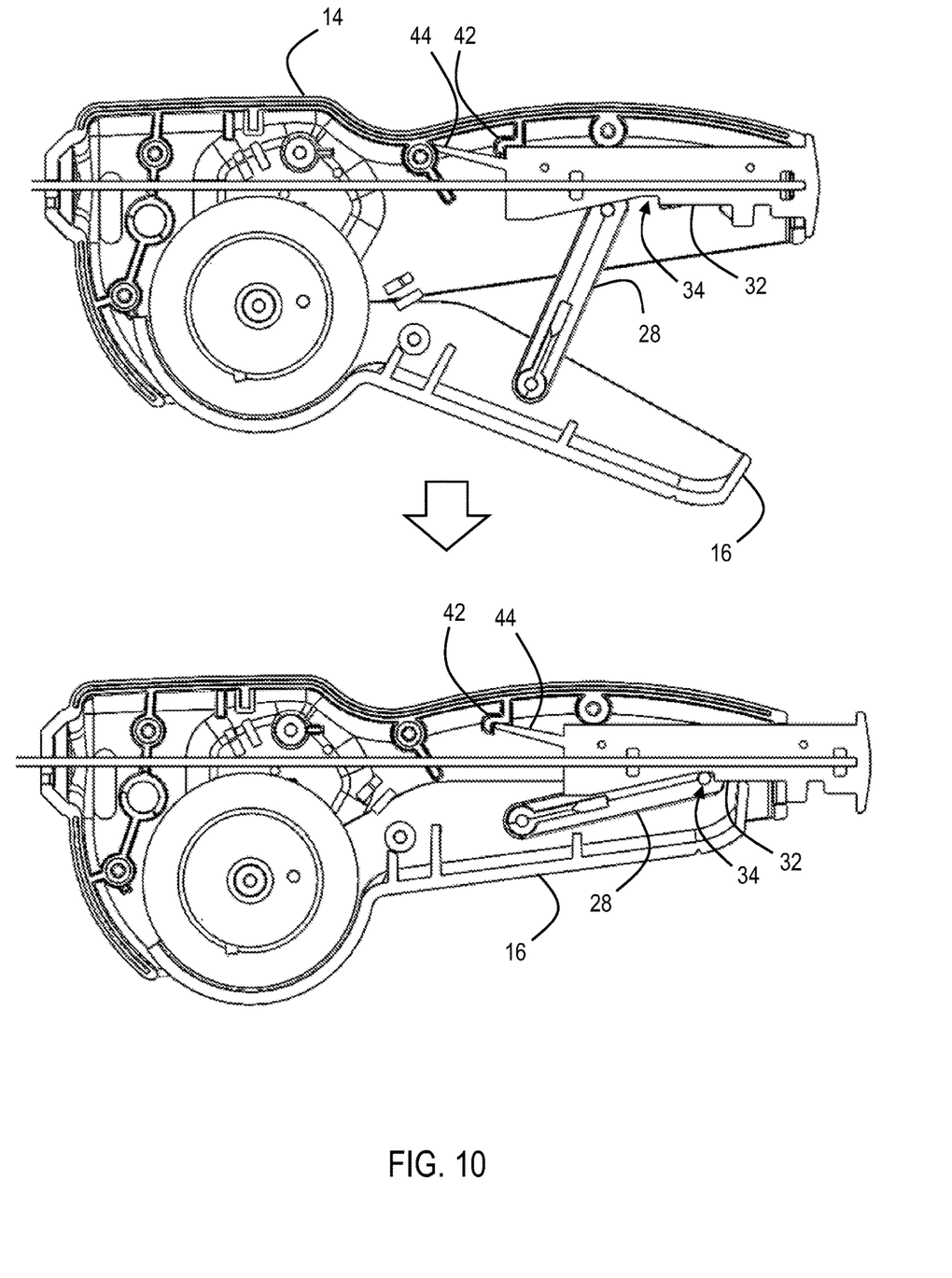
FIG. 10 is a pair of side views an all suture anchor deployment device according to the present invention showing the movement of the device from the second, open position to the third, closed position.

Referring to FIGS. 9 and 10, movement of lever 16 from the position of FIGS. 7 and 8 to a closed, third position against body 14 as seen in FIGS. 9 and 10 allows lever 16 to drive link 28 to retract fork 12 longitudinally within body 14. In use, fork 12 is inserted into pilot hole in the bone so that the tip 40 of fork 12 positions the anchor within the bone. Fork 12 is designed to be retracted by device 10 a predetermined distance so that tip 40 of fork 12 remains within the pilot hole, albeit not a deeply as during initial insertion. As an example, the distance of the withdrawal of the fork may be 14 mm, which would leave the tip of fork 12 approximately 6 mm below the surface of a standard pilot hole formed in bone in conventional surgeries.

Figure 11:
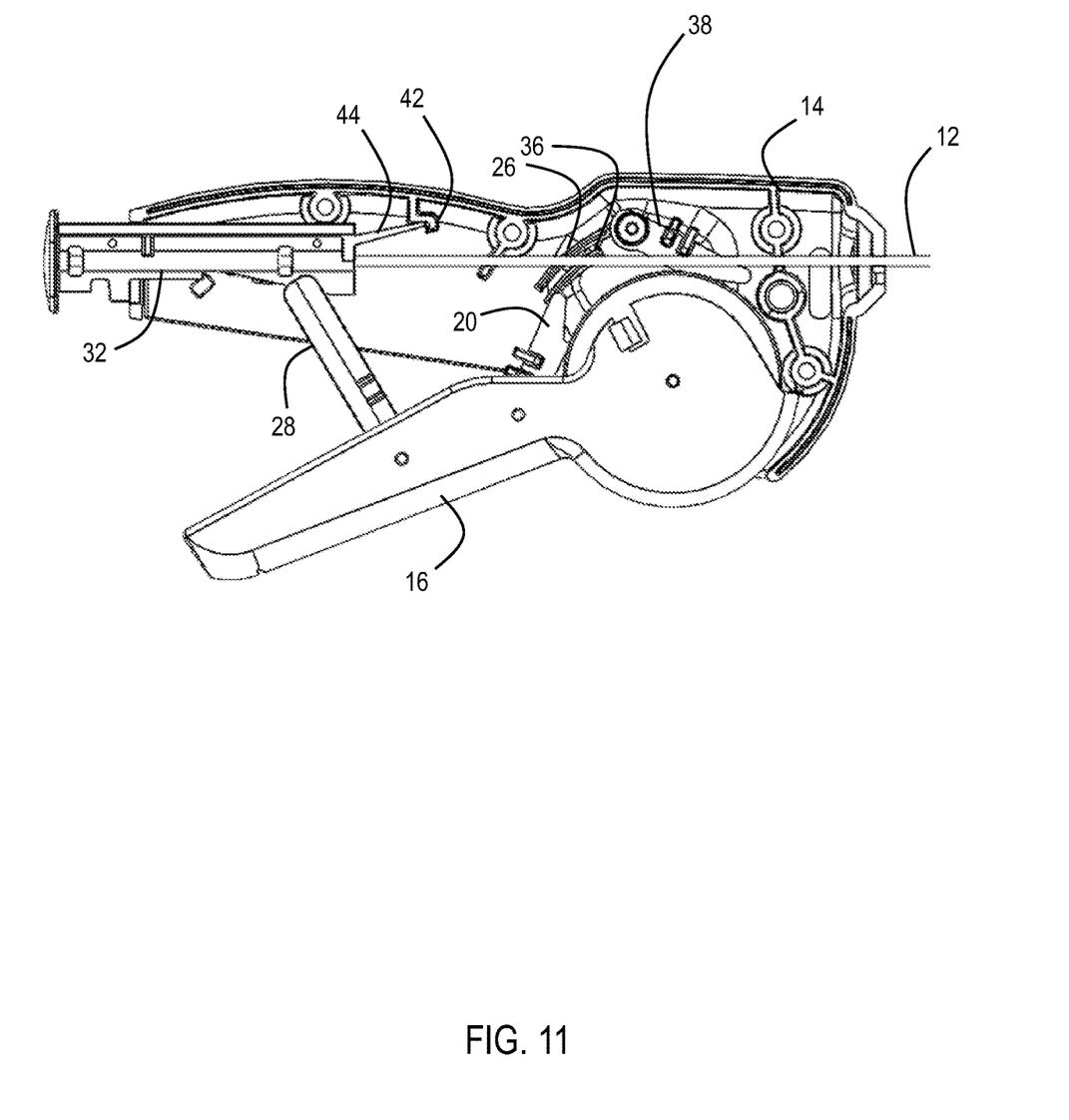
FIG. 11 is a side view of an all suture anchor deployment device according to the present invention in a fourth, open position where the device is configured for ratcheting of any filament onto the spool.

Fork 12 is captured in the retracted position by a detent 42 of body 12 that engages a tongue 44 extending from bearing member 32 so that fork 12 remains retracted during further operation of lever 16 of device 10, as seen in FIG. 11. When lever 16 moved into the closed position against body 14, as seen in FIG. 10, pawl 20 is released from the blocking action of second fence 36 to move into engagement with ratchet wheel 18, thereby allowing for ratcheting of ratchet wheel 18 and associated rotation of spool 20 that is coupled to ratchet wheel 18 by frangible link 22 when lever 16 is moved. Lever 16 may then be opened into an open position, as seen in FIG. 11, where advancing pawl 20 is allowed to engage ratchet wheel 18 for the first time and the remains engaged with ratchet wheel 18 as fence 26 and fence 36 will no longer block advancing pawl 20 during subsequent movement of lever 16. Subsequent closing of lever 16 into a closed position will drive ratchet wheel 18 so that spool 30 winds up the suture filament extending from braided anchor without any movement of fork 12. Lever 16 may be repeatedly opened and closed once the position of FIG. 11 is initially reached to gradually wind up the filament on spool 20.

The tension to suture filament provided by winding of spool 30 ensures that braided anchor expands in place with the bone. When the tension applied by spool 20 to the suture filament exceeds the predetermined amount of tension set by frangible link 22, frangible link 22 will break, thereby decoupling spool 20 from ratchet wheel 18. As a result, withdrawal of device 10 from the surgical location allows unspooling of the suture filament because spool 20 is no longer coupled to advancing pawl or one way pawl 38 by virtue of the decoupling from ratchet wheel 18. When device 10 is fully removed, the deployed anchor remains inside the bone and the suture filament extends from the pilot hole in the standard configuration needed for surgical anchoring of tissue to the bone. The tensioning of the suture filament to deploy the braided anchor and release of the suture filament after deployment of the braided anchor may thus be performed using one hand without any further uncleating of the suture filament from deployment device 10 as spool 20 will unwind and release the filament after frangible link 22 has broken without any action by the user.

What is claimed is:

1. A deployment device for an all suture anchor having a braided anchor and a suture filament extending through the anchor, comprising:
   a body;
   a fork extending longitudinally through the body and moveable between an extended position and a withdrawn position;
   a ratchet wheel rotatably mounted to the body;

a spool coupled to the ratchet wheel by a frangible link; and a lever coupled to the fork via a link that is pivotally coupled at a first end to the lever and at a second end to a bearing member of the fork to move the fork longitudinally within the body from the extended position to the withdrawn position and to the ratchet wheel to rotate the ratchet wheel, wherein the bearing member includes a notch that is engaged by the link when the lever is in an open position.

2. The device of claim 1, wherein the body includes a pawl positioned to selectively engage the ratchet wheel.

3. The device of claim 2, wherein the body includes a first fence preventing the pawl from engaging the ratchet wheel when the lever is an initial position.

4. The device of claim 3, wherein the body includes a first fence preventing the pawl from engaging the ratchet wheel when the lever is an open position.

5. The device of claim 4, wherein the pawl is free to engage the ratchet wheel when the lever is a closed position.

6. The device of claim 5, further comprising a latch that can releasably secure the latch in the initial position.

7. The device of claim 6, further comprising a detent associated with the body and positioned to lock the fork in the withdrawn position.

8. The device of claim 7, wherein the fork moves a distance of 14 millimeters from the extended to the withdrawn position.

9. The device of claim 8, wherein the frangible link is configured to break in response to a force of 40 pounds of tension on a filament captured by the spool.

* * * * *